United States Patent Office 3,300,456
Patented Jan. 24, 1967

---

3,300,456
POLYMERIC ACETYLENES AND PROCESS FOR PRODUCING THE SAME
Allan S. Hay, Schenectady, N.Y., assignor to General Electric Company, a corporation of New York
No Drawing. Filed Nov. 21, 1962, Ser. No. 239,315
16 Claims. (Cl. 260—88.2)

This application is a continuation-in-part of my application, Serial No. 19,186, filed April 1, 1960, now abandoned and assigned to the same assignee as the present invention.

This invention relates to a self-condensation reaction resulting in the oxidative coupling of organic compounds containing at least two terminal acetylenic groups ($CH{\equiv}C-$) directly bonded to the organic nucleus by a process which comprises reacting these compounds with oxygen in homogeneous solution in the presence of a dissolved oxygen-carrying intermediate comprising an amine-basic cupric salt complex, and to the novel products produced by this method. More particularly, this invention relates to the reaction of oxygen with organic compounds containing a terminal acetylenic group in a homogeneous solution also containing dissolved therein an oxygen-carrying intermediate comprising an amine-basic cupric salt complex, and to the novel polymeric products produced thereby. Specifically, this invention relates to the oxidation, in a homogeneous solution, of organic compounds containing at least two terminal acetylenic groups using as the oxygen-carrying intermediate, a solution comprising a basic cupric salt complex of an amine selected from the group consisting of aliphatic, primary, secondary and tertiary amines and cyclic secondary and tertiary amines. Such cyclic amines include cycloaliphatic and aromatic amines in which the amine nitrogen forms part of the ring and cycloaliphatic amines in which the cycloaliphatic group is a substituent on the amine nitrogen. Such amines are best described as amines having an amine nitrogen free of directly bonded aryl substituents.

I use the term "organic compound containing at least one terminal acetylenic group" to designate those organic compounds containing one or more $CH{\equiv}C-$ groups (ethynyl groups) directly bonded to hydrogen or to a carbon atom of an organic radical. This organic radial may be an aliphatic or aromatic radical which may have one or more substituents other than the terminal acetylenic groups. Such a term therefore includes organic compounds containing at least one terminal acetylenic group wherein one or more of the hydrogens of the aliphatic or aromatic nucleus has been substituted by, for example, halogen, —OH, —OR $$-O-\overset{O}{\overset{\|}{C}}-R, -\overset{O}{\overset{\|}{C}}-OR, -\overset{O}{\overset{\|}{C}}-R, -\overset{O}{\overset{\|}{C}}-NH_2, -\overset{O}{\overset{\|}{C}}-NHR, -\overset{O}{\overset{\|}{C}}-NR_2$$

—CN, —SH, —SR, —SSH, —SSR, —SOR, —NO$_2$, —SO$_2$R, —NH$_2$, —NHR, —NR$_2$, etc. In all of the above formulas, R may be a monovalent organic radical such as defined above.

The reaction of acetylene in the presence of an aqueous solution of an ammoniacal cuprous compound to form vinyl and divinyl acetylene is well known. This reaction is restricted to acetylene and is an addition reaction in which one triple bond is converted to a double bond for each acetylene added to the nucleus as illustrated by the following equation.

Equation I $$2CH{\equiv}CH \xrightarrow[CuCl,\ NH_4Cl]{aqueous} CH_2{=}CH-C{\equiv}CH$$

Although the above reaction is not applicable to substituted acetylenes, these latter materials in the presence of oxygen and an aqueous mixture of cuprous chloride and ammonium chloride will undergo a coupling reaction involving the oxidation of the acetylenic hydrogen of two acetylene groups to form water and a diacetylene compound. When the organic compound contains only one terminal acetylenic group, the compound is a di-substituted diacetylene. When the organic compound contains two terminal acetylenic groups, the compounds produced are linear and cyclic polyacetylenes of low molecular weight. In the reaction between an organic compound containing two terminal acetylenic groups in a pyridine solution in the presence of cupric acetate, the reaction proceeds in the absence of oxygen to form the cyclic dimers, trimers, tetramers, etc., of the polyacetylenes. Only small amounts of a linear dimer are formed and then only if the starting material is 1,5-hexadiyne ($HC{\equiv}C-CH_2CH_2-C{\equiv}CH$). In all of these reactions, the time is exceedingly long and copper must be used in the ratio of at least one mole of copper for each mole of acetylenic starting material, and usually is used in great excess.

Unexpectedly, I have now discovered a general, rapid and inexpensive method of oxidatively coupling organic compounds containing at least one terminal acetylenic group to produce various self-condensation products in substantially quantitative yields which comprises oxidizing such acetylenic compounds with oxygen in homogeneous solution in the presence of a dissolved oxygen-carrying intermediate comprising an amine-basic cupric salt complex, which does not need to be present in large amounts. The products produced by my process are dependent on the acetylenic compound used as the starting material. If the organic compound contains only one terminal acetylenic group (ethynyl group), the product is a di-organic-substituted diacetylene as shown by the following equation.

Equation II $$2RC{\equiv}CH \xrightarrow{[O]} RC{\equiv}C-C{\equiv}CR + H_2O$$

If the starting material is an organic compound having two terminal acetylenic groups, the product instead of being cyclic is a linear polymer, as shown by the following equation.

Equation III $$nCH{\equiv}C-R-C{\equiv}CH \xrightarrow{[O]} H{-}\!\!\left(\!C{\equiv}C-R-C{\equiv}C\!\right)_{\!n}\!\!{-}H + (n-1)H_2O$$

where $n$ is an integer representing the number of repeating units joined together to form the polymer molecule and is at least 2, but usually represents the value of at least 10, and is more probably at least 50 and the hydrogen atoms are on the terminal acetylenic groups of the polymer molecule. When the organic compound contains three or more terminal acetylenic groups, the product is a three-dimensional, cross-linked, insoluble, infusible polymer. However, for those products which are extremely insoluble in known solvents, determination of molecular weight is impossible by solution techniques.

It is to be understood that my reaction is not a direct oxidation, as illustrated, but an oxidation involving participation of the copper catalyst systems as an oxygen-carrying intermediate.

The general method of carrying out my oxidation process is to pass an oxygen-containing gas through a solution of one or more organic compounds, each containing at least one terminal acetylenic or ethynyl group (hereinafter referred to as "ethynyl compound") as the starting material, said solution also containing dissolved therein a complex comprising at least one basic cupric salt and at least one amine. The ethynyl compounds which can be oxidized by my process are represented by the following formula:

$$R(-C{\equiv}CH)_m$$

where R is a substituent selected from the group consisting of hydrogen and organic radicals as defined previously and $m$ is an integer and is at least 1 up to the number of replaceable hydrogen atoms on the organic nucleus. Preferably, $m$ is no more than 2, and R is an aromatic nucleus.

In providing the catalyst comprising a basic cupric salt and an amine, the particular copper salt used has no effect on the type of product obtained. I may start with either a cuprous or a cupric salt. The only requirement is that, if a cuprous salt is used, it must be capable of existing in the cupric state and must form a complex with the amine that is soluble in the reaction medium. The necessity for being able to exist in the cupric state is based on my belief that the oxidation of the ethynyl compound is accomplished by the oxygen reacting with the amine-cuprous salt complex to form an intermediate activated amine-basic cupric salt complex that reacts with the ethynyl compound to form an unstable intermediate which decomposes forming the self-condensation product of the acetylenic compound and water as the products and regenerates the amine-cuprous salt complex. This activated complex can also be formed by starting originally with a cupric salt in making the copper-amine complex, for example, by using a reducing agent which unites with the liberated anion and forms the cuprous salt in situ, e.g., copper metal. However, more simple methods may be used, for example, the activated complex may be formed by adding cupric hydroxide to a cupric salt, adding a base to a cupric salt, adding an alkali metal derivative of the ethynyl compound being oxidatively coupled, by treating a cupric salt with an ion-exhange resin having exchangeable hydroxyl groups, etc. Preferably, these reactions are carried out in the presence of the amine to prevent precipitation of the basic cupric salt, but it is possible to add the amine later to dissolve the basic cupric salt even as a precipitate. As will be explained in more detail later, the amount of hydroxyl ion introduced into the complex should not be sufficient to convert the cupric salt to cupric hydroxide unless additional cupric salt is added later.

Typical examples of the copper salts suitable for my process are cuprous chloride, cupric chloride, cuprous bromide, cupric bromide, cuprous sulfate, cupric sulfate, cuprous azide, cupric azide, cuprous tetraammine sulfate, cupric tetraamine sulfate, cuprous acetate, cupric acetate, cuprous propionate, cupric butyrate, cuprous palmitate, cupric laurate, cuprous benzoate, cupric toluate, etc. Cuprous chloride, cupric chloride, cuprous bromide, cupric bromide, cuprous azide, and cupric azide, produce the highest molecular weight polymers. Although cupric sulfite is not known, cuprous sulfite can be used because it evidently is oxidized to cuprous sulfate. Copper salts such as cuprous iodide, cuprous sulfide, cupric sulfide, cuprous cyanide, cuprous thiocyanate, etc., are not suitable for use in my process, since they are either not soluble in amines or are not capable of existing as stable cupric salts. For example, cupric cyanide and cupric thiocyanate autogenously decompose to the corresponding cuprous salt. Cuprous nitrate and cuprous fluoride are not known to exist but the amine complexes can be made in situ. Substitution of cupric chloride, cupric sulfate, cupric perchlorate and cupric nitrate for the cuprous salt, without first converting them to the corresponding basic cupric salt, gave no oxidation of the ethynyl compounds in the presence of an amine.

Examples of amines which are free of aryl substituents directly bonded to the amine nitrogen that may be used in practicing my invention are the aliphatic amines, including cycloaliphatic amines wherein the cycloaliphatic group is substituted on the amine nitrogen, for example, mono-, di- and trimethylamine,
mono-, di- and triethylamine,
mono-, di- and tripropylamine,
mono-, di- and tributylamine,
mono-, di- and trisecondary propylamine,
mono-, di- and tribenzylamine,
mono-, di- and tricyclohexylamine,
mono-, di- and triethanolamine,
ethylmethylamine,
methylpropylamine,
allylethylamine,
methylcyclohexylamine,
morpholine,
methyl-n-butylamine,
ethylisopropylamine,
benzylmethylamine,
octylbenzylamine,
octylchlorobenzylamine,
methylcyclohexylamine,
methylphenethylamine,
benzylethylamine,
di(chlorophenethyl)amine,
1-methylamino-2-phenylpropane,
1-methylamino-4-pentene,
N-methyldiethylamine,
N-propyldimethylamine,
N-allyldiethylamine,
3-chloro-N,N'-dimethylpropylamine,
N-butyldimethylamine,
N-isopropyldiethylamine,
N-benzyldimethylamine,
N-benzyldioctylamine,
N-chlorobenzyldioctylamine,
N-cyclohexyldimethylamine,
N-phenethyldimethylamine,
N-benzyl-N-methylethylamine,
N-bromobenzyl di(chlorophenethyl)amine,
N,N-dimethyl-2-phenylpropylamine,
N-dimethyl-4-pentenyl amine,
N,N-diethyl-2-methyl amine, etc.

When aliphatic amines are used, I prefer that the aliphatic groups be straight chain hydrocarbon groups.

Examples of cyclic amines are the pyridines, such as pyridine itself, α-, β- and γ-collidine, α-, β- and γ-picoline, and 2,4-, 2,5-, 2,6-, and 3,4-lutidine, quinuclidine, the dipyridyls, the pyrroles, the pyrrolidines, the piperidines, the diazoles, the triazoles, the diazines, the triazines, the quinolines, the diquinoyls, the isoquinolines, the tetrahydroquinolines, the tetrahydroisoquinolines, the phenanthrolines, the morpholines, etc., including the ring-substituted products of these cyclic amines whereby one or more of the hydrogen atoms on the carbons forming the ring are substituted by groups which may be aliphatic (for example, methyl, ethyl, vinyl, propyl, propenyl, butyl, amyl, hexyl, heptyl, octyl, etc., and isomers and the homologues thereof), alkoxy (for example, methoxy, ethoxy, vinyoxy, propoxy, propenoxy, butoxy, etc., and isomers and homologues thereof), aryl (for example, phenyl, tolyl, dimethylphenyl, chlorophenyl, bromotolyl, naphthyl, chlorobromonaphthyl, etc., and isomers and homologues thereof), aryloxy (for example, phenoxy, toloxy, xyloxy, chlorophenoxy, naphthoxy, etc., and isomers and homologues thereof), and the like. The ring substituents may be the same or different hydrocarbon groups. It is understood that secondary cyclic amines, e.g., piperidines, pyrroles, pyrrolidines, tetrahydroquinolines, tetrahydroisoquinolines may also be used in the form of tertiary amines whereby an alkyl hydrocarbon radical, such as those listed above for the ring substituents, is attached to the amine nitrogen group, e.g., N-methylpyrrole,
N-methyl tetrahydroquinoline,
N-methyl tetrahydroisoquinoline,
N-methyl piperidine,
N-methyl pyrrolidine, N-methylimidazole,
N-methyl-1,2,4-triazole,
N-decylpiperidine,
N-decylpyrrolidine,
N-isobutylpiperidine,
1-decyl-2-methylpiperidine,
N-isopropylpyrrolidine,
N-cyclohexylpiperidine, etc.

In general, primary, secondary, tertiary, mixed primary-secondary, mixed primary-tertiary or mixed secondary-tertiary polyamines would behave in the same way as primary, secondary and tertiary monoamines in my reaction, except of course, the amount used would only have to be that amount necessary to give the equivalent amount of amino groups. I may use polyamines wherein two or more amine groups, of the kind listed above for the monoamines, are attached to an aliphatic or cycloaliphatic nucleus, e.g., ethylene, diethyleneamine, propylene, butylene, pentylene, hexylene, cyclopentylene, cyclohexylene, etc. Typical examples of these aliphatic polyamines are the N,N-dialkylethylenediamines,
N,N,N'-trialkylethylenediamine,
propanediamine,
ethylenediamine,
the N-alkylethylenediamines,
the N-alkylpropanediamines,
the N,N'-dialkylpropanediamines,
the N,N,N'-trialkylpropanediamines,
propanediamine,
the N-alkylpropanediamines,
the N,N'-dialkylbutanediamines,
pentanediamine,
the N-alkylpentanediamines,
the N,N'-dialkylpentanediamines,
the N,N,N'-trialkylpentanediamines,
diethylenetriamine,
the N-alkyldiethylenetriamines,
the N'-alkyldiethylenetriamines,
the N,N',N''-trialkyldiethylenetriamines,
the N,N',N'-trialkyldiethylenetriamines,
the N,N',N'-trialkyldiethylenetriamines,
the N,N',N',N''-tetraalkyldiethylenetriamines,
the N',N',N'',N''-tetraalkyldiethylenetriamines,
the cyclohexylenediamines, etc.

Likewise, the polyamines may be mixed aliphatic and cyclic amines, e.g., aminoalkyl pyridines, alkylaminoalkylpyridines, etc. I have, however, discovered that those polyamines which have only two or three aliphatic or cycloaliphatic carbon atoms separating the two primary or secondary amino nitrogens represent a class of polyamines which are strong chelating agents and form complexes with the copper salt which so completely envelop the copper that the complex is less reactive than the other aliphatic primary or secondary amines in the oxidation reaction. Because of this, I prefer, when using primary or secondary amines, to use primary and secondary monoamines. However, this is not true of tertiary polyamines. Typical examples of such tertiary amines are:

N,N,N',N'-tetramethylethylenediamine;
N,N,N',N'-tetraethylethylenediamine;
N,N,N',N'-tetrapropylethylenediamine;
N,N,N',N'-tetrabutylethylenediamine,
N-butyl-N-octyl-N',N',-dimethylethylenediamine;
N¹,N¹-dibenzyl-N²,N²-dimethyl-1,2-propanediamine,
2-chloro-N,N,N',N'-tetraethyl-1,3-propanediamine,
N'-(3-chloro-p-tolyl)-N,N-diethyl-N'-methyl-
 1,3,2-(β-dimethylaminoethyl)pyridine,
N,N,N',N'-tetrabenzyl-3-butene-1,2-diamine;
N,N,N',N'-tetramethyl-2-butyne-1,4-diamine,
N,N,N',N'-tetraallylputrescine,
N,N,N',N'-tetramethyl-1,4-diphenylputrescine,
N,N,N',N'-tetraisopropyl-1,3-butanediamine,
N,N,N',N'-tetramethyl-1,3-cyclopentanediamine,
N,N,N',N'-tetramethyl-1,4-cyclohexanediamine, etc.,
N-ethyl-N,N',N'-trimethylethylenediamine;
N-methyl-N,N',N'-triethylethylenediamine;
N,N,N',N'-tetramethyl-1,3-propanediamine;
N,N-dimethyl-N',N'-diethylethylenediamine;
1,2-bis(2-methylpiperidino)ethane;
N,N,N',N'-tetra-n-hexylethylenediamine;
N,N,N',N'-tetra-n-amylethylenediamine;
1,2-bispiperidinoethane;
N,N,N',N'-tetraisobutylethylenediamine;
N,N,N',N'-tetramethyl-1,3-butanediamine;
N,N,N',N'-tetramethyl-1,2-cyclohexanediamine;
1,2-bis(2,6-dimethylpiperidino)ethane;
N,N-didecyl-N',N'-dimethylethylenediamine;
N-methyl, N',N',N'',N''-tetraethyldiethylenetriamine;
N-decyl-N,N',N'-triethylethylenediamine;
2-(β-piperidinoethyl)pyridine;
2-(β-dimethylaminoethyl)-6-methylpyridine;
2-(β-dimethylaminoethyl)pyridine;
2-(β-morpholinoethyl)pyridine; etc.

In general, tertiary amines are more oxidatively stable than primary and secondary amines. Also, my studies have shown that tertiary amines form a complex which is a more active catalyst for the oxidative coupling reaction forming the basis of this application. Therefore, I prefer tertiary amines as the amine to be used in forming the amine-basic cupric salt complex. For the oxidative coupling of the aliphatic acetylenes, e.g., the monoacetylenes and diacetylenes, I have found that a particularly active catalyst is formed by using a diamine in which the two tertiary amine groups are separated by two or three carbon atoms, numerous examples of which have been given above.

Many factors affect the stability of the complex of the amine and the copper salt. These factors are well known in the art and are discussed in detail in such texts as "The Chemistry of the Coordination Compounds" edited by John C. Bailar, Jr., Reinhold Publishing Corp., New York, 1956, see for example pages 174 to 190; and "Mechanisms of Inorganic Reactions," Fred Basolo and Ralph G. Pearson, John Wiley and Sons, Inc., New York, 1958, see for example pages 14–24. As pointed out in the latter text on page 18, one of the major factors influencing stability is the basicity of the ligand. I have found that apparently the ability to form a stable complex as indicated by the basicity of the amines I use as ligand also is an indication of the activity of the catalyst. Those amines which are strong bases form more active catalysts than amines which are weak bases. When the latter are used, typical examples of which are 3,5-diphenylpyridine, phenanthridine, etc., I find that heating of the reaction mixture is desirable to cause the self-condensation reaction to proceed rapidly.

The effect of an N-aryl group in amines, e.g., aniline, N-methylaniline, N,N-dimethylaniline, methyldiphenylamine, etc., is to reduce the basicity of the amine so that its ability to form the copper complex is greatly reduced. Further, the stability of the amine under oxidizing conditions is greatly reduced. Because of these two effects I prefer to use amines which are free of N-aryl substituents.

Some of the ethynyl compounds which may be oxidized by my process include: acetylene itself, the aliphatic acetylenes, e.g., propyne, 1-butyne, 3-methyl-1-butyne, 3-phenylpropyne, 1-pentyne, 3-ethyl-3-methyl-1-pentyne, 5-fluoropentyne, 3-chloro-3-phenylpropyne, 3-bromopropyne, 3-chloro-1-butyne, and the analogous higher alkyl acetylenes, e.g., 1-dodecyne, 1-octadecyne, etc., the aromatic acetylenes, e.g., phenylacetylenes, ethynylnaphthalenes, ethynylanthracenes, ethynylpyridines, etc., including those same compounds wherein one or more of the hydrogen atoms of the aliphatic or aromatic group are substituted with, for example, one or more additional ethynyl groups, e.g., 1,4-pentadiyne, 1,5-hexadiyne, 1,7-octadiyne, 1,11-dodecadiyne, 1,17-octadecadiyne, the diethynylbenzenes, for example, orthodiethynylbenzene, metadiethynylbenzene, para-diethynylbenzene, the diethynylnaphthalenes, the diethynylanthracenes, the diethynylpyridines, the diethynylpyrimidines, etc., including those compounds in which one or more hydrogen atoms of the organic nucleus of either the mono- or polyacetylene derivatives are substituted with, for example, a halogen atom, for example, chlorine, bromine, fluorine, iodine, and such radicals as —OH, —OR

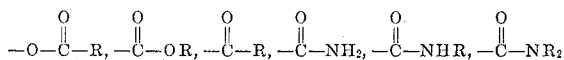

—CN, —SH, —SR, —SSH, —SSR, —SOR, —NO$_2$, —SO$_2$R, —NH$_2$, —NHR, —NR$_2$, etc., wherein R in all of the above radicals represents a member selected from the group consisting of hydrogen and monovalent organic radicals, many examples of which have been given above. Examples in addition to those given above are 3-butyne-1-ol, 2-propyne-1-ol, N-propynylaniline, propriolic acetate, propriolic amide, propriolophenone, 2-propynylamine, N,N-dimethylpropynylamine, 2-propynyl sulfide, methyl-3-butynoate, 3-butyne-2-ol, 3-butyne-2-one, para-bromophenylacetylene, nitrophenylacetylene, etc. Since these substituents do not enter into the actual coupling reaction, although it is possible that they might be oxidized during the coupling reaction, there is no limitation as to what the substituents may be. However, from a practical standpoint and because of their extremely interesting properties, I prefer that the starting material be acetylene or a hydrocarbon-substituted acetylene, for example, an alkyl or aryl acetylene, or an alkylene or phenylene diacetylene, since in these compounds the carbon content is extremely high, especially in the aryl acetylenes and arylene diacetylenes, so that they can be used as a source of carbon in many unique applications, as discussed later.

As shown by the previous equations, the oxidation producing coupling or self-condensation results in removal of the hydrogen atom on the ethynyl group, still further raising the carbon content of the coupled compounds and especially of the polymeric materials. Surprisingly, I have found one extremely interesting group of polymers. These are the polymers produced by the oxidative coupling of meta-diethnylbenzene and copolymers of meta-diethynyl-benzene, with one or more diethynylalkanes and para-diethynylbenzene, in which the amount of para-diethynylbenzene is no more than 25 mole percent. Both the polymers of meta-diethynylbenzene and its copolymers can be chain-stopped to control molecular weight by inclusion of an organic compound containing a single terminal acetylenic group. Preferably, this compound is an aryl acetylene, such as phenylacetylene. These polymers and copolymers are soluble in a wide variety of solvents above 100° C., for example, in chlorobenzene, nitrobenzene, and chlorinated hydrocarbons, such as tetrachloroethane. When these solutions are cast, for example, on a glass plate and the solvent evaporated, they produce tough, transparent films which are stable up to about 180° C. before they start to slowly decompose. If heated rapidly to a high temperature, or ignited with a flame, they burn vigorously to leave a coherent carbon film. When the polymers are gradually heated, to control this vigorous decomposition reaction, they can be used to deposit a very coherent and useful carbon film, since this carbon film can now be heated while measuring the resistivity which will gradually decrease during the heating step as the temperature is raised. When a finite desiable value is obtained, the heating may be discontinued by rapidly cooling and the film will maintain the resistivity value that it had when the heating was stopped. If such a film is now incorporated into a vacuum system such as a highly evacuated glass envelope, the film will maintain the resistivity value it has, even though heated to a temperature higher than the temperature at which it was heated in air. Because of the fact that the polymer before the heating started was over 96% carbon, the volume change and tendency to form a discontinuous carbon film is much less than would have been the case with ordinary organic compounds. In other words, these polymers produce solutions in which the solute is over 96% carbon. This is the nearest approach to providing a true solution of carbon.

I have found that the films as cast from solution are amorphous, but if I immerse them at room temperature in certain organic liquids they crystallize. Tetrahydrofuran causes very rapid crystallization, dimethyl acetamide acts more slowly and ethyl acetate even more slowly while other liquids such as benzene, toluene, chlorobenzene, o-dichlorobenzene and dimethyl formate apparently cause no crystallization. The effect of crystallization is two-fold. The initially clear amorphous films become cloudy and the film does not decompose as vigorously when heated. The amorphous film, once ignited, continues to burn when the flame source is removed, while the crystalline film does not.

These polymers and copolymers of meta-diethynylbenzene are in marked contrast to the polymers prepared from its two isomers, ortho-diethynylbenzene and para-diethnylbenzene. Both of these latter materials when oxidatively coupled produce insoluble polymers which cannot be dissolved in the same solvents used above with meta-diethynylbenzene polymers, and furthermore, the polymers decompose at much lower temperatures, for example, the polymer of ortho-diethynylbenzene decomposes at about 140° C., while the polymer of para-diethynylbenzene decomposes at 100° C. However, I have found that the polymer of para-diethynylbenzene, as well as the ortho- and meta-polymers, may be dissolved in chloroform if chlorine is bubbled through. Precipitation of these polymers by the addition of alcohol gives a light yellow polymer containing chlorine.

Although I do not want to be bound by my theory, I believe that one mole of a copper salt forms a complex with two moles of amine nitrogen in the amine, e.g., a mole of monoamine has one mole of amine nitrogen, a diamine has two moles of amine nitrogen, etc. However, it is possible to carry out my reaction with as little as 0.66 mole of amine nitrogen to one mole of copper. However, it may be that in this case only part of the copper is complexed or polynuclear complexes may form. The complex formed from a cuprous salt and a tertiary amine can react with oxygen to form an oxidized intermediate while the complex formed from a cupric salt is already in the form of the oxidized intermediate which in some manner can form a complex with the ethynyl compound. This latter complex activates the ethynyl group in some way so that self-condensation occurs between ethynyl groups on different molecules, with the regeneration of the catalyst in the reduced or cuprous state which can react with additional oxygen to form the active oxidized intermediate. This belief is based on the fact that, if I pass oxygen into my catalyst system prepared from a cuprous salt until it is saturated or treat one equivalent of a cupric salt with one equivalent of a base and then add the acetylenic compound, with no further addition of oxygen, one equivalent of acetylenic compound is oxidized for two moles of catalyst present. By such a reaction, I can cause the self-condensation of ethynyl compounds without actually passing oxygen into the reaction system containing the acetylenic reactant. These reactions are illustrated by the following equations using R—C≡CH to represent a monoacetylenic compound and (A) to represent a monoamine, KOH as representative of a typical base and CuCl and CuCl$_2$ as representative of typical cuprous and cupric salts.

PREPARATION OF AMINE-BASIC CUPRIC SALT COMPLEX

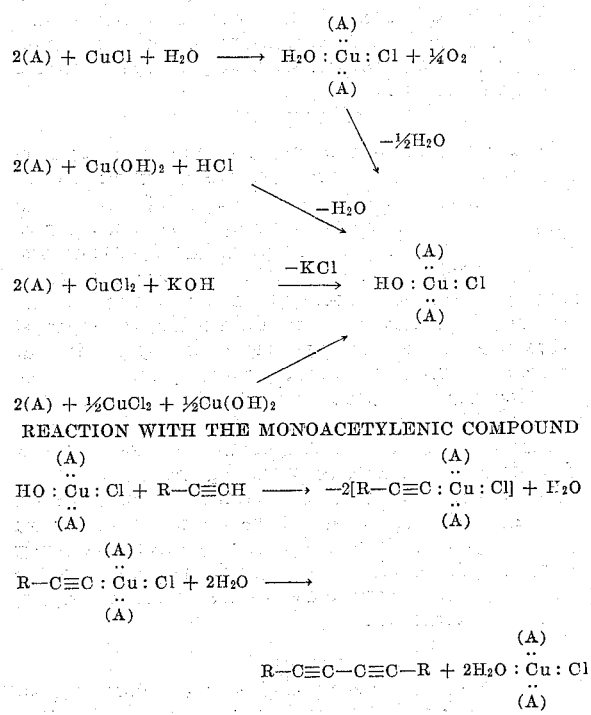

REACTION WITH THE MONOACETYLENIC COMPOUND

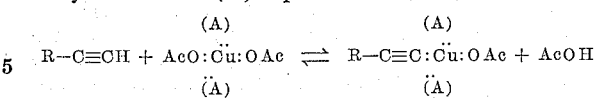

$$R-C\equiv C:\overset{(A)}{\underset{(A)}{Cu}}:Cl + 2H_2O \longrightarrow$$

$$R-C\equiv C-C\equiv C-R + 2H_2O:\overset{(A)}{\underset{(A)}{Cu}}:Cl$$

As is readily apparent from Equations II and III, when a compound having more than one ethynyl group is reacted the product is a polymer rather than the diacetylenic compound. It will be noted that although the above is theoretical it does provide indications as to the role of water in determining the nature of the product and how the complex is regenerated and acts as the oxygen-carrying intermediate. Since water is a product of the reaction and completely anhydrous reagents are extremely difficult to obtain, I have never found it necessary to actually add water to the reaction mixture even when starting with a cuprous salt.

As will be evident from the above equations, it is desirable when starting with a cupric salt to add one equivalent of base for each mole of copper salt to most effectively use all of the copper. If less base is used then only the equivalent amount of copper salt is converted to the catalytically active amine-basic cupric salt complex leaving the balance of the cupric salt unchanged which even in the form of its amine complex is an inactive ingredient in the system. Likewise, if more than one equivalent of base is added, then some or all of the cupric salt is converted into cupric hydroxide which likewise is an inactive ingredient even in the form of its amine complex. In effect, the addition of more or less than one equivalent of base, i.e., one mole of hydroxyl ion, to a mole of cupric salt results in the same effect as though less of the cupric salt had been used to form the amine-basic cupric salt complex. This same effect is noted if more than one equivalent of acid, i.e., one mole of hydrogen ions or one more of a cupric salt is added to one mole of cupric hydroxide in forming the complex.

The cupric salts of carboxylic acids, for example, cupric acetate, cupric benzoate, etc., represent a unique class of cupric slats. They will form a complex with amines which, in the presence of oxygen, will produce polyacetylenic products but the reaction is slower than if the cupric carboxylate had been converted to the corresponding amine-basic cupric carboxylate complex. Evidently because of the weakly acidic nature of carboxylic acids, the acetylenic compound and the cupric carboxylate complex are in equilibrium with the acetylenic complex and the carboxylic acid according to the following equation. Again R—C≡CH represents the terminal acetylenic compound, AcO represents the carboxylate ion and (A) represent a monoamine:

$$R-C\equiv CH + AcO:\overset{(A)}{\underset{(A)}{Cu}}:OAc \rightleftharpoons R-C\equiv C:\overset{(A)}{\underset{(A)}{Cu}}:OAc + AcOH$$

Apparently the equilibrium is predominantly to the left-hand side of the equation, since the slow reaction indicates a low concentration of the active species.

It will be noted that this acetylenic-cupric complex on the right-hand side of the equation is the same as would be obtained from a cuprous salt and oxygen or a cupric salt and a base when reacted with a terminal acetylenic compound in a non-equilibrium reaction. In the specification and claims, I use the term "amine-basic cupric salt complex" to denote the catalytically active complex described above which acts or is used as the oxygen-carrying intermediate in the oxidation of the ethynyl compounds to self-condensation products. As shown above, this complex can be obtained either from cuprous or cupric salts and oxidizes the acetylenic compounds to self-condensation products while the copper in the complex is reduced to the cuprous state.

If the quantity of acetylenic compound to be reacted is greater than can be oxidized by the amount of complex present, oxygen, is introduced into the reaction mixture to re-oxidize the cuprous complex back to the basic cupric complex. Whether this is done or whether the stoichiometric amount of the amine-basic cupric salt complex is used to oxidize the acetylenic compound, the net overall reaction in either case is the reaction of oxygen, either elemental or from the complex, with the acetylenic compound. This reaction, therefore, may best be described as the reaction of ethynyl compounds with oxygen using the amine-basic cupric complex as the oxygen-carrying intermediate.

I may use mixtures of amines and mixtures of copper salts for forming my catalyst system. Preferably, the copper-amine complex is dissolved in the solvent before the terminal acetylenic compounds is added. In some cases, the solution of the copper-amine complex may be hastened by heating the mixture, by bubbling in air or oxygen, or a combination thereof. In order to effectively use all of the copper, enough amine should be added to complex and thereby dissolve all of the added copper salt. Larger excesses of amine do not adversely affect the reaction, and in some cases, may be desirable in order to completely dissolve all of the terminal acetylenic compound reactant and to act as the solvent for the reaction product. Other solvents such as alcohols, ketones, hydrocarbons, chlorohydrocarbons, nitrohydrocarbons, ethers, esters, amides, mixed ether esters, sulfoxides, etc., may be present in the reaction system providing they do not interfere or enter into the oxidation reaction.

Oxygen or an oxygen-containing gas is bubbled into the reaction mixture causing an exothermic reaction to take place with the formation of water as a by-product. It is preferable to prevent the escape of this water of reaction from the reaction vessel when carrying out the reaction by the batch process or to control the escape of water so that there is always one mole of water present for each mole of copper catalyst when carrying out the reaction by the batch or continuous process. This can be done by carrying out the reaction under reflux conditions, in a closed reaction system at superatmospheric pressure, by cooling, in the presence of desiccants, or any combination thereof, with a controlled removal of water if desired. This can be done, for example, by sweeping with an inert gas, by carrying out the reaction at subatmospheric pressure, by azeotropic distillation, by the use of open reaction vessels, by heat or any combination thereof. In carrying out my reaction, the oxygen can be diluted with an inert gas such as nitrogen, helium, argon, etc., or air can be used. By controlling the ratio of oxygen to inert gas and the inlet temperature of this mixture, I can conveniently sweep the reaction mixture to cause removal of all of the water as it is formed if desired.

Since the reaction is usually exothermic, the reaction can become overheated, resulting in the formation of undesirable products. This is especially true in the formation of the polymeric products, where I have noticed that if I do not control the heat of reaction, the resins tend to discolor. Generally, I initiate the oxidation reaction at as low a temperature as the reaction will start, as evidenced by the reaction becoming exothermic. Usually, I control my oxidation reaction so that the maximum temperature does not exceed 100° C., and preferably does not exceed 80° C. The heat of reaction may be removed, for example, by radiation, convection, or by cooling coils which can either be immersed in or surround the reaction vessel.

Ordinarily I continue the passage of oxygen into the reaction mixture until no more heat is generated or the desired amount of oxygen is absorbed. Alternatively, I may intermittently or continuously add the same or a different terminal acetylenic compound than the starting material during the oxidation reaction, to produce a mixed polyacetylene which has a different structure than if the mixed terminal acetylenic compounds were used as starting materials. To terminate the reaction, I destroy the catalyst system by the addition of an acid, preferably a mineral acid such as hydrochloric or sulfuric acid, which reacts with the amine and copper salt, or I remove the product from the presence of the catalyst either by filtering off the product if it has precipitated, or by pouring the reaction mixture into a material which is a solvent for the catalyst system but a non-solvent for the product. Alternatively, I may precipitate the copper as an insoluble compound an filter it from the solution prior to isolating the product, or I may add a chelating agent which inactivates the copper. After the product is precipitated, it may be redissolved and reprecipitated any desirable number of times to remove the impurities if they are soluble materials. Finally, it is filtered and washed free of any remaining contaminants. When dry, the product may be used as a chemical compound for the preparation of other materials, or if it is a polymer it may be fabricated into various shapes, or it may be dissolved in solvents to prepare solutions which can be used in the preparation of coatings, fibers, etc., which can later be decomposed to form carbonaceous materials.

In order that those skilled in the art may better understand my invention, the following examples are given which are illustrative of the practice of my invention, and are not intended for purposes of limitation. In the examples, all parts are by weight, unless stated otherwise. Intrinsic viscosity is measured in deciliters per gram when measured in nitrobenzene at 150° C.

*Example 1*

To a 500 ml. Erlenmeyer flask was added 250 ml. pyridine, 2 grams cuprous chloride and 50 grams phenylacetylene. Oxygen was passed through the vigorously stirred reaction mixture cooled in a bath at 30° C. The pot temperature climbed to 40° throughout the reaction. After 40 minutes the exotherm subsided and the reaction mixture was flooded with water and filtered. The crystalline solid was filtered and recrystallized from alcohol to yield 42.7 grams (86%) of diphenyldiacetylene, colorless needles melting point 88° C.

*Example 2*

Oxygen was bubbled through a vigorously stirred solution of 0.5 gram of cuprous chloride and 0.45 gram of N,N-dimethylamine dissolved in 140 ml. of N,N-dimethylacetamide. After addition of 10 grams of phenyl acetylene, the temperature of the reaction mixture rose from 28° C. to 34.5° C. After a reaction period of 1 hour, the solution was filtered and the product precipitated from the filtrate by addition of water. After recrystallization from alcohol, the product was identified as diphenyldiacetylene having a melting point of 88° C.

When an equivalent amount of methylamine is substituted for the N,N-dimethylamine in the above reaction, the reaction proceeds as readily to again produce diphenyldiacetylene.

*Example 3*

Oxygen was bubbled through a vigorously stirred solution of 1.7 grams of cupric chloride dihydrate and 10 grams of phenyl acetylene dissolved in 130 ml. of pyridine. No reaction occurred during a 20-minute period. At this point, 0.56 gram of potassium hydroxide was added and the reaction immediately became exothermic requiring the use of a cooling bath to moderate the temperature of the reaction. After the reaction was no longer exothermic, the product was precipitated by pouring the reaction mixture into water to yield 8.9 grams of a product identified as diphenyldiacetylene having a melting point of 88° C.

This example shows that a cupric salt such as cupric chloride is not capable of producing the active catalyst obtained with a cuprous salt unless it is first converted into the basic cupric salt. Other means of converting cupric salts to the basic cupric salt have been previously given and are entirely suitable for the preparation of the oxygen-carrying intermediate for the oxidative coupling of ethynyl compounds.

*Example 4*

To a 250 ml. Erlenmeyer flask was added 1 gram cuprous chloride, 1.5 grams N,N,N′,N′-tetramethylethylenediamine and 135 ml. of pyridine. Oxygen was passed through the vigorously stirred reaction mixture which was in a bath at 30° C. Then 10 grams of 1-ethynylcyclohexanol was added. The pot temperature rose to 35° C. and then subsided. After 30 minutes the reaction mixture was flooded with water to give colorless crystals, which were filtered and washed with water. There was obtained 7.6 grams of 1,1′-dihydroxydicyclohexylbutadiyne, melting point 180°–181.5° C.

*Example 5*

To a 500 ml. flask was added 2 grams cuprous chloride, 3.2 grams N,N,N′,N′-tetramethylethylenediamine and 250 ml. pyridine. Oxygen was passed through the vigorously stirred solution then 25 grams of octyne-1 was added. In 21 minutes the temperature rose to 57° C. After a further 40 minutes the temperature was back to 30° C. The reaction mixture was flooded with water, extracted with ether and washed with dilute hydrochloric acid. The ether layer was dried and distilled to yield 15.3 grams of 7,9-hexadecadiyne, boiling point 117° C./0.6 mm., $n_D^{20.5}$ 1.4834.

*Example 6*

To a 250 ml. Erlenmeyer flask was added 1 gram cuprous chloride, 2.4 grams of N,N,N′,N′-tetramethylethylenediamine and 135 ml. of pyridine. The reaction was vigorously stirred and oxygen was passed into the reaction. Acetylene was then bubbled into the reaction mixture slowly for 3 minutes. The temperature rose from 30° to 38° C. during this time. After the acetylene was stopped, the reaction continued. In 7 minutes, the temperature rose to 55° C. then began to subside. After 3 minutes the reaction mixture was filtered and washed with methanol containing some hydrochloric acid.

The solid on the filter which looked like carbon black was dried for 4 hours at 100° C. under high vacuum to give 2 grams of a finely divided solid which has no melting point. The material is insoluble in all solvents and is very finely divided.

*Analysis.*—C, 62.3; H, 4.0. Some of the material was heated to about 600° C. in a test tube. The analysis was then C, 82.8; H, 2.2.

Example 7

To a 250 ml. Erlenmeyer was added 0.59 cuprous chloride and 125 ml. of pyridine. Oxygen was passed through the vigorously stirred solution then there was added 2.37 grams of meta-diethynylbenzene. A vigorous reaction ensued. In 14 minutes the temperature rose to 40° C. and a precipitate began to settle from solution. The reaction was continued for 2 minutes longer then precipitated in methanol and filtered then washed with methanol containing a little hydrochloric acid and dried in vacuo. There was obtained 2.25 grams of an almost colorless powder that begins to decompose at about 180° C. and gradually darkens as the temperature is raised.

*Analysis.*—Cal. for $(C_{10}H_4)_n$: C, 96.75; H, 3.25. Found: C, 96.4; H, 3.5. The material is soluble in most organic aromatic solvents such as chlorobenzene, nitrobenzene, and in chlorinated hydrocarbons such as s-tetrachloroethane above 100° C. If a nitrobenzene solution is evaporated at 170°, a tough, transparent film remains that has a tensile strength of 5000 p.s.i. When ignited in air a vigorous reaction ensues the net result of which is removal of most of the hydrogen. Thus a piece of film weighing 0.068 gram was ignited and the residue after ignition weighed 0.0648 gram, i.e., a loss of 0.00329 or 4.7%. This material was now C, 96.2%; H, 0.8%. When heated in vacuo rapidly to ca. 200° C., a violent reaction occurs and gases are evolved that analyze ca. 90% hydrogen and 10% methane. During the decomposition the residue is red hot.

If the oxidation is run using N,N,N',N'-tetramethylethylenediamine the reaction is much faster, e.g., the maximum temperature is reached in 2 to 3 minutes; however, the product is the same.

The structure of the polymer is

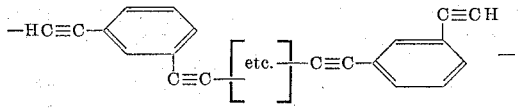

By infrared analysis of end groups the molecular weight is at least 7,000, indicating that $n$ is at least 70. The infrared spectrum is consistent with the structure.

Phenylacetylene is typical of materials that may be used as a chain stopper in this reaction. Three meta-diethynylbenzene oxidations were run using the above procedure with added phenylacetylene and the intrinsic viscosities of the resultant polymers determined at 50° C. in nitrobenzene.

(1) 1.5 grams of meta-diethynylbenzene+0.3 gram of phenylacetylene $\eta_0 = 0.14$.

(2) 2 grams of meta-diethynylbenzene+0.025 gram phenylacetylene $\eta_0 = 0.185$.

(3) 2 grams of meta-diethynylbenzene+0.01 gram phenylacetylene $\eta_0 = 0.25$.

It is noted that the higher the concentration of phenylacetylene, the lower the molecular weight of the polymer.

Example 8

When para-diethynylbenzene is oxidized the same way as meta-diethynylbenzene, it gives a bright yellow solid that is insoluble in all solvents and begins to decompose about 100° C.

*Analysis.*—Calc'd for $C_{10}H_4$: C, 96.75; H, 3.25. Found: C, 95.1; H, 3.8. This material has similar thermal characteristics. When suspended in chloroform it dissolves if chlorine is bubbled through. Precipitation with alcohol gives a light yellow solid which evolves chlorine when heated above 200° C.

*Analysis.*—C, 41.2; H, 1.7; Cl, 55.7. This corresponds to an empirical formula $C_{10}H_{4.9}Cl_{4.56}$.

In a similar way ortho-diethynylbenzene gives an insoluble yellow-brown solid that begins to decompose at about 140° C.

Example 9

The following copolymers of meta- and para-diethynylbenzene were prepared using the process of Example 5:

(a) 2 grams meta-diethynylbenzene+1 gram para-diethynylbenzene (b) 1 gram meta-diethynylbenzene+2 grams para-diethynylbenzene (c) 1.5 grams meta-diethynylbenzene+0.5 gram para-diethynylbenzene;

(a) and (b) gave polymers that were insoluble in all the usual solvents. They decomposed when heated. (c) which has the least amount of the para isomer gave a soluble, yellow polymer that could be cast into flexible films from nitrobenzene at 170° C.

Example 10

Copolymers of meta-diethynylbenzene and 1,8-nonadiyne were prepared as follows:

(a) 2 grams meta-diethynylbenzene, 2 grams 1,8-nonadiyne (b) 2 grams meta-diethynylbenzene, 1 gram 1,8-nonadiyne (c) 2 grams of meta-diethynylbenzene, 0.5 gram 1,8-nonadiyne.

Each of the above mixtures were oxidized in 135 ml. pyridine containing as catalyst 2 grams cuprous chloride and 7 grams N,N,N',N'-tetramethylethylenediamine. Yellow-brown soluble polymers were obtained that could be cast into tough, flexible films. These films could be thermally decomposed in the same way as the other films of meta-diethynylbenzene polymer. The greater the concentration of 1,8-nonadiyne, the more sooty the flame was when the polymers were ignited.

As Examples 7–10 have shown, I am able to make high molecular weight polymers by oxidative coupling of meta-diethynylbenzene. The polymers are practically insoluble in solvents below 100° C. and, therefore, precipitate from the reaction mixture. High molecular weight polymers are thus obtained only because the oxidation is very rapid, i.e., in a slow oxidation the polymer would precipitate before a high molecular weight was obtained. Therefore, these polymers cannot be prepared by the prior art processes, all of which require a very long reaction time.

Example 11

A film of the polymer made by oxidatively coupling meta-diethynyl benzene, 10 millimeters x 2 millimeters x 0.02 millimeter, was crystallized by immersing in tetrahydrofuran. The resistance of this film was monitored while it was heated in nitrogen. After a few hours' heating at 510–525° C., the resistance changed from an initial value of infinity to 1,000 megohms measured at 515° C. On heating overnight, the resistance dropped to 82 megohms measured at 511° C. and during the following day it dropped further to 41 megohms measured at 514° C.

Example 12

A solution was made of 1 gram of the oxidatively coupled polymer of meta-diethynyl benzene dissolved in a mixture of 4 ml. of nitrobenzene and 2 ml. of chlorobenzene. Solutions were also made in which the concentration of the polymer was 1/10, 1/50 and 1/100 of the above concentration. Pieces of a porous alumina ceramic 0.499 inch long x 0.12 inch wide and 0.0605 inch thick were preheated to 165° and soaked in the above solutions also maintained at a temperature of 165° C. Nine to twelve samples were soaked in each of the above four solutions. After removing from the solution, these pieces were baked for 8 minutes at 165° to volatilize the solvent. After cooling to room temperature, the test pieces were soaked overnight in tetrahydrofuran to crystallize the polymer. The polymer was carbonized by firing at 1,000° C. in nitrogen. After cooling, the test pieces were brushed with a stiff test tube brush to remove the surface carbon scale.

Copper leads were fastened to the lengthwise ends of the test pieces with silver paste and the resistance measured. The average value resistance of the test pieces prepared from the 4 concentrations in the order of from the most concentrated to the most dilute solution was 27.4 ohms, 1,190 ohms, 46,300 ohms, and 1,900,000 ohms. These resistors had three desirable characteristics: (1) a nearly linear change in resistance with temperature in the range from −50 to 200° C., (2) reproducible resistance values on temperature cycling after the first cycle, and (3) a linear voltage-current relationship.

In a manner similar to that described in Examples 11 and 12, the other soluble polymers of diethynyl compounds and the copolymers of meta-diethynyl benzene with other diethynyl compounds may likewise be used to prepare films or coatings which are decomposed to produce carbonaceous films which are useful in making conductive films and resistors as described in these examples.

*Example 13*

To a 250 ml. Erlenmeyer flask was added 2 grams of cuprous chloride, 7 grams of N,N,N′,N′-tetramethylethylenediamine and 135 ml. of pyridine in a bath at 28° C. Oxygen was passed through with vigorous stirring then 6 grams of 1,8-nonadiyne was added. In 5 minutes the pot temperature rose to 38° C., then subsided after 13 minutes to bath temperature. The product was precipitated in methanol and filtered, washed with methanol containing some hydrochloric acid then dried in vacuo to give 4.6 grams of a pale brown solid that begins to soften about 82° C. to a viscous liquid. When heated rapidly to 240° C. in vacuo it exploded. This material is soluble in chloroform, but on standing it soon turns purple and becomes insoluble. This color formation is characteristic of aliphatic conjugated diynes.

In a similar way 1,7-octadiyne gives a similar material that begins to soften at 140° C. and 1,6-heptadiyne gives a similar material that begins to soften about 95° C.

Because of the reactivity of the acetylenic group to either add on or react with various organic reagents, the di-substituted diacetylenic compounds produced by my invention may be used, for example, as chemical intermediates for the preparation of other interesting and valuable organic compounds. For example, they may be hydrogenated or halogenated to produce fully saturated, organic compounds having many and varied uses in the chemical field. The insoluble polymers may be compacted and formed into solid fuels or used as fillers in the soluble polymers used to produce films. Many other wide and useful applications, in addition to those already disclosed, may be made of the soluble polymers of meta-diethynylbenzene and its copolymers with other acetylenic compounds when used as coating materials or impregnants of porous materials and later thermally decomposed if desired. They may be used as binders for any solid fuel or for the insoluble polymers of the present invention. My process may also be used to convert acetylene to carbonaceous materials having many interesting and valuable properties for use, for example, as fillers for natural and synthetic rubbers and other polymeric and resinous compositions.

Obviously, other modifications and variations of the present invention are possible in the light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of oxidatively coupling acetylenic compounds which comprises reacting oxygen with a compound having at least two $HC{\equiv}C-$ groups, using as the oxygen-carrying intermediate, a solution of an amine-basic cupric salt complex in which said acetylenic compound is soluble.

2. The process of oxidatively coupling acetylenic compounds which comprises reacting oxygen with a compound having at least two $HC{\equiv}C-$ groups, using as the oxygen-carrying intermediate, a solution of a tertiary amine-basic cupric salt complex in which said acetylenic compound is soluble.

3. The process of claim 1 wherein the compound has the formula $HC{\equiv}C-R'-C{\equiv}CH$ wherein R′ is a divalent organic radical.

4. The process of claim 3 wherein R′ is a divalent aliphatic radical.

5. The process of claim 3 wherein R′ is an alkylene radical.

6. The process of claim 3 wherein R′ is a divalent aromatic radical.

7. The process of claim 3 wherein R′ is an arylene radical.

8. The process of oxidatively coupling a diethynyl-benzene which comprises reacting oxygen with a diethynylbenzene, using as the oxygen-carrying intermediate, a solution of an amine-basic cupric salt complex in which said diethynylbenzene is soluble.

9. The process of producing a soluble, polymeric acetylenic compound which comprises reacting oxygen with meta-diethynylbenzene, using as the oxygen-carrying intermediate, a solution of an amine-basic cupric salt complex in which said meta-diethynylbenzene is soluble.

10. The process of claim 9 wherein the amine-basic cupric salt complex is a tertiary amine-basic cupric salt complex.

11. The process of making a soluble, acetylenic copolymer which comprises reacting oxygen with meta-diethynylbenzene containing up to 25 mole percent of para-diethynylbenzene, using as the oxygen-carrying intermediate a solution of an amine-basic cupric salt complex in which the meta-diethynylbenzene is soluble.

12. A polymer having the formula

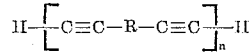

where R is a divalent hydrocarbon group, n is an integer and is at least 10.

13. The polymer of claim 12 wherein R is alkylene or arylene.

14. The polymer of claim 12 wherein R is phenylene of which 0–25 percent are p-phenylene and the balance are m-phenylene.

15. A polymer having the formula

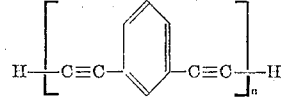

where n is an integer and is at least 10.

16. The process of claim 2 wherein, the tertiary amine is a tertiary diamine in which the two amino groups are separated by at least two and no more than three carbon atoms.

References Cited by the Examiner

UNITED STATES PATENTS

| | | | |
|---|---|---|---|
| 2,796,442 | 6/1957 | Franke et al. | 260—94.1 |
| 3,027,278 | 3/1962 | Reick | 117—226 |
| 3,039,897 | 6/1962 | Waring et al. | 117—226 |
| 3,065,283 | 11/1962 | Happel et al. | 260—678 |
| 3,142,711 | 7/1964 | Bauchwitz | 260—678 |

JOSEPH L. SCHOFER, *Primary Examiner.*

RICHARD D. NEVIUS, *Examiner.*

W. L. JARVIS, H. I. CANTOR, *Assistant Examiners.*